Nov. 8, 1966     M. C. VARIN ETAL     3,283,406
TIME-CONTROLLED TRIGGERING APPARATUS RESPONSIVE
TO THE TAUTENING OF A FLEXIBLE MEMBER
Filed July 27, 1964     3 Sheets-Sheet 1
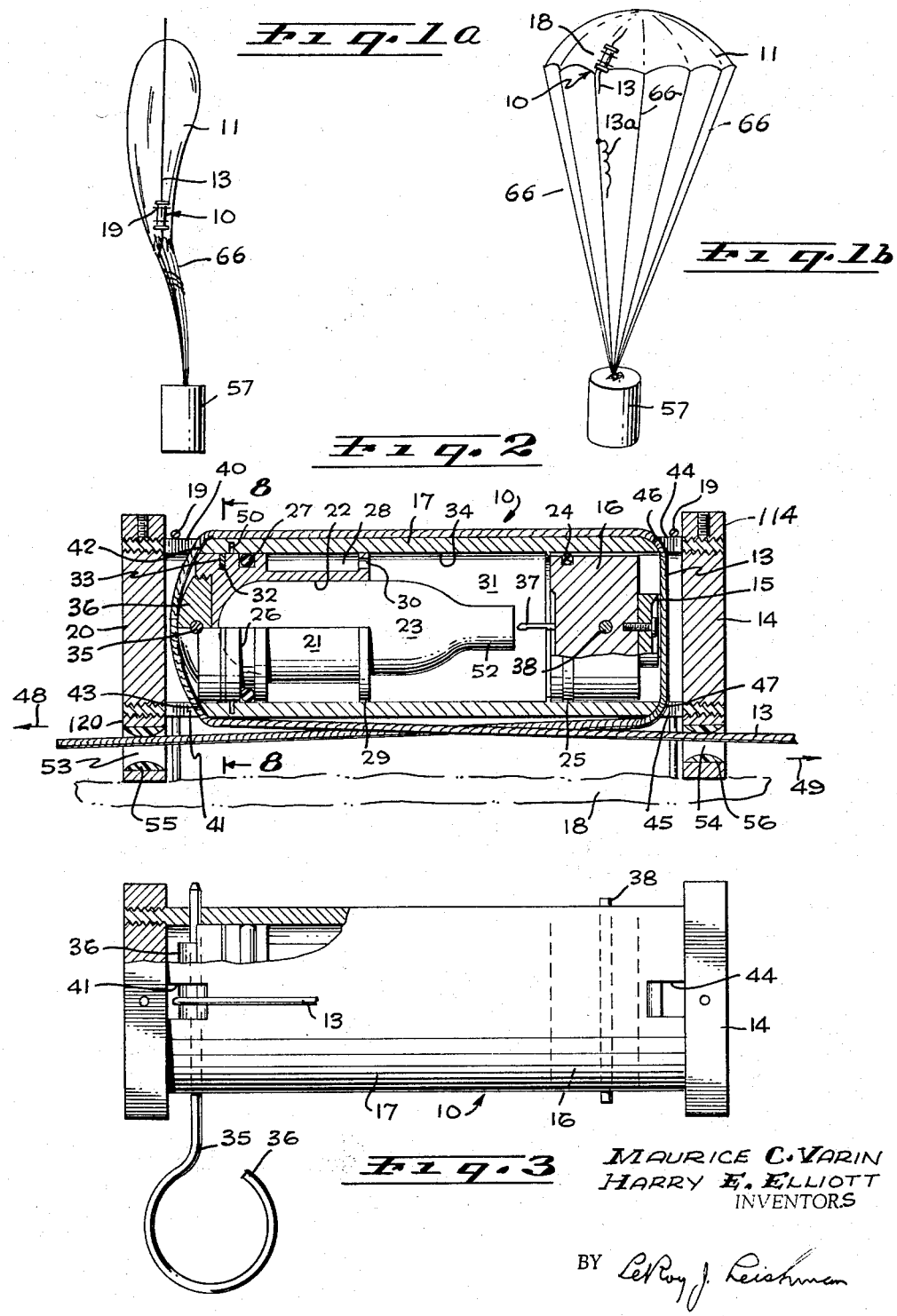
MAURICE C. VARIN
HARRY E. ELLIOTT
INVENTORS

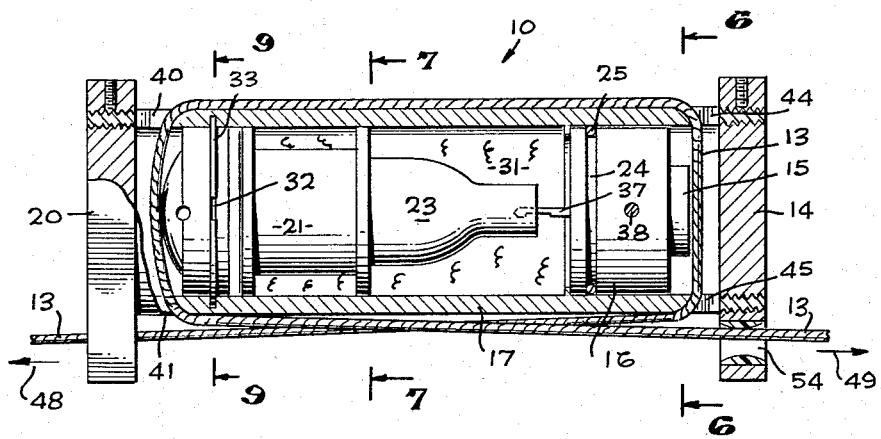

Nov. 8, 1966  M. C. VARIN ETAL  3,283,406
TIME-CONTROLLED TRIGGERING APPARATUS RESPONSIVE
TO THE TAUTENING OF A FLEXIBLE MEMBER
Filed July 27, 1964  3 Sheets-Sheet 3
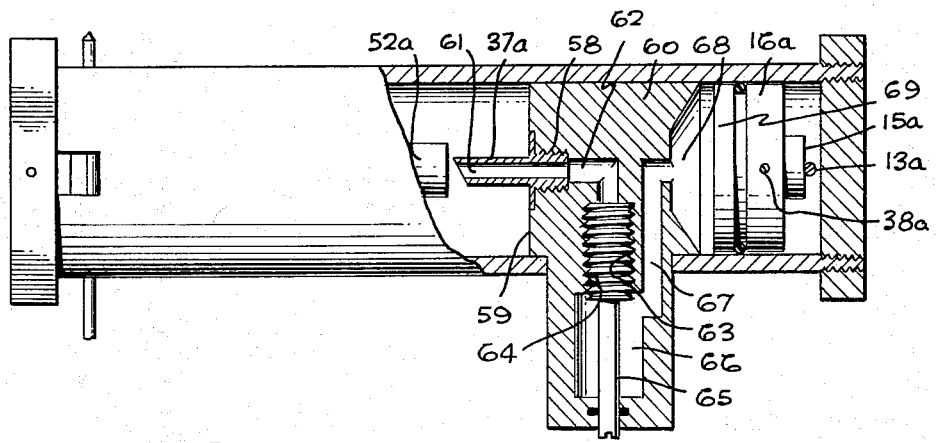
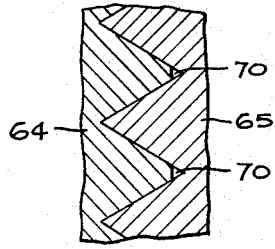
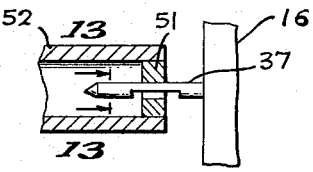
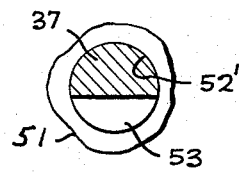
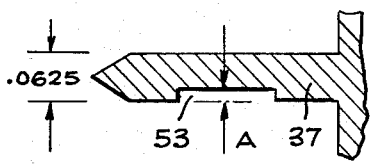
MAURICE C. VARIN
HARRY E. ELLIOTT
INVENTORS
BY
LeRoy J. Leishman
AGENT United States Patent Office 3,283,406
Patented Nov. 8, 1966

3,283,406
TIME-CONTROLLED TRIGGERING APPARATUS RESPONSIVE TO THE TAUTENING OF A FLEXIBLE MEMBER
Maurice C. Varin, 4120½ W. 161st St., Lawndale, Calif., and Harry E. Elliott, 1963 Rosemary, Costa Mesa, Calif.
Filed July 27, 1964, Ser. No. 385,324
6 Claims. (Cl. 30—180)

The invention herein described pertains to automatic means whereby a timing interval is initiated by a pulling force upon a control member; and more particularly to such means when the force is applied by flexible instrumentalities.

Although this invention has many other applications, its present principal uses pertain to the opening of parachutes.

It is well-known that when a parachute is used to control the descent of a person from an aircraft, that such person pulls a cord at a specified interval of time after leaving the craft, this cord effecting the opening of the main parachute at a time when its velocity with respect to the surrounding air is great enough to cause the parachute to open. When it is not possible to control this interval of time by means of a human agency, as when animals, birds or inanimate objects are to be dropped, various automatic devices have been employed to effect the opening of the parachute after the lapse of an interval controlled by a timing device.

These timing devices are usually costly, and many of them are unreliable.

In one device for controlling this interval, an explosive actuates a knife that shears a reefing or rip cord, the explosive being discharged by means of a fuse that is lighted either when the objects leave the plane or when a reefing cord becomes taut, and the interval of time that assures the proper opening of the parachute is controlled by the length of the fuse. This method has not proven dependable, partly because the explosives sometimes deteriorate in storage, particularly if the explosive is a powder.

One of the objects of the present invention is to provide automatic means whereby the aforementioned timing interval may be dependably controlled.

Another object is to provide a reliable mechanism to shear the reefing cord in time-delayed response to its becoming taut.

A further object is to provide means of the type described that will be inexpensive to build.

An additional object is to provide a device of the type described that will not deteriorate even after a long lapse of time.

Another object of the present invention is to provide means whereby a compressed gas will furnish the motive power for operating the shearing blade.

A further object is to provide a device in which the shearing knife will be operated by a piston that is moved by the pressure of said gas.

An additional object is to provide means for controlling the aforementioned interval of time by the size of the passageway through which the compressed gas is released into the area adjacent the piston.

A subsidiary object is to provide means in which the pressurized gas is contained in a cartridge and in which the time interval is controlled by the size of the release orifice made in the cartridge.

Still another object is to control this interval by the relative cross sectional areas of the portion of the pin that transverses this orifice after it is made and the area of the orifice itself.

An additional object is to control the time interval by a pre-adjustable orifice.

Yet another object is to provide means whereby the pressure of the gas against the aforementioned piston does not move the piston until a shear pin is broken.

And it is a further and more generalized object of the present invention to afford means whereby a triggering device may be operated in response to the tautening of a flexible member at the end of a predetermined interval.

This invention possesses many other advantages, and has other objects which may be made more clearly apparent from a consideration of illustrative embodiments of the invention. For this purpose, such embodiments are shown in the drawings accompanying and forming part of the present specification. These embodiments will now be described in detail, illustrating the general principles of the invention; but it is to be understood that this detailed description is not to be taken in a limiting sense, since the scope of the invention is best defined by the appended claims.

Referring to the drawings:

FIGURE 1a is a diagrammatic representation of a closed parachute to which a load has been attached, the shroud cords of the parachute being encircled by a rip or reefing line connected to a device mounted on the parachute for cutting the rip cord or reefing line at the end of a predetermined interval;

FIG. 1b shows the parts pictured in FIG. 1a after the rip cord or reefing line has been cut;

FIG. 2 is a longitudinal section through one embodiment of the present invention, revealing a cartridge and piercing pin each carried by a different piston, these parts being shown in the positions that they occupy before the pin has pierced the seal of the cartridge;

FIG. 3 shows the device of FIG. 2 with a portion broken away and with a shearing pin indicated in phantom near the right end of the device and a safety keeper pin passing through the piston near the opposite end;

FIG. 4 is a view similar to FIG. 2 but with the piston at the left moved to a second position in which the piercing pin carried by the piston at the right has pierced the cartridge and released some of the gas into the area between the two pistons, and showing the reefing cord laced through the device and passing near the cutting tool;

FIG. 5 is a view of the right end portion of the device shown in FIG. 4, but showing the situation as the shear pin breaks and releases the cutting tool to sever the reefing cord;

FIG. 6 is a cross section taken substantially on line 6—6 of FIG. 4;

FIG. 7 is a section taken substantially on line 7—7 of FIG. 4;

FIG. 8 is a section taken on line 8—8 of FIG. 2;

FIG. 9 is a section taken on line 9—9 of FIG. 4;

FIG. 10 is a section taken on line 10—10 of FIG. 8;

FIG. 11 is a section taken on line 11—11 of FIG. 9;

FIG. 12 shows the piercing pin of one embodiment of the invention extending through the pierced neck of the compressed gas cartridge and revealing the gas escape passageway, the cross section of which may be predetermined by the depth of a notch in the piercing pin;

FIG. 13 is a cross section through the pin taken on line 13—13 of FIG. 12;

FIG. 14 is a longitudinal section through the piercing pin, this figure being included to facilitate an explanation of how the depth of the cut in the pin controls the effective size of the gas escape orifice;

FIG. 15 is a longitudinal section through a modified form of the device in which an adjustable screw controls the speed with which gas passes from the pierced cartridge to a pressure chamber adjacent the piston or plunger that shears the reefing cord; and FIG. 16 is an enlarged view showing how the space between the threads of the adjusting screw and the female threads with which it is engaged controls the size or number of the orifices or the length of the passageway through which the gas must pass in route from the pierced compressed gas capsule and the pressure chamber adjacent the cutting piston.

As hereinbefore explained, it is not advisable for parachutes to be permitted to open until sufficient momentum has been acquired by the falling object to assure that the parachute will open properly. The parachute is consequently held in a closed condition until a reefing cord 13 that surrounds the shroud lines of the parachute is severed at the end of a predetermined time interval.

In the present device, a rip or reefing cord 13, FIGS. 1a and 2, passes between a closure disc 14 and a cutting ring 15, and it is a primary object of the present device to bring the knife 15 into quick engagement with the disc 14 to sever the cord 13 when the parachute whose shroud lines are encircled by this rip or reefing cord has acquired the desired momentum. Accordingly, the disc 14 and the cutting blade 15 are so associated with other components that the blade and disc will come together rapidly after the lapse of a predetermined interval of time following the release of the parachute and the attached package from the craft that has carried them aloft.

In the presently preferred embodiment of the invention, the cutting blade 15 is a cylindrical shaped ring that is attached to one end of a piston 16 disposed within a cylinder 17 secured in any appropriate manner to the cord 13 itself and/or a portion 18 of the parachute. In FIG. 2, the cylinder 17 is shown attached to the chute by means of metal bands 19, but other suitable fastening devices may be used instead.

The aforementioned disc 14 may close one end of the cylinder 17, and the other end may appropriately be closed by a similar disc or closure member 20. The end discs 14 and 20 may be peripherally threaded so that they may be screwed into the appropriately internally threaded ends of the cylinder 17, as indicated in FIGS. 2 and 3, and the cylinder may be externally threaded to receive the internally threaded collars 121 and 114. These collars may be rectangular in shape, as shown in FIG. 7.

The components within the cylinder 17 are provided for the purpose of forcing the plunger 16 against the cord 13 and disc 14 with a sudden impact at the end of the aforementioned timing interval. The assembly within the cylinder 17 comprises an additional piston or plunger 21 having an axial recess 22 extending inwardly from the end of the plunger that faces the piston 16 which carries the cylindrical knife 15 on its opposite or right end. The recess or cavity 22 is preferably rounded at its closed end to form a nest for a cartridge or capsule 23, such as the well-known carbon dioxide or $CO^2$ cartridges that are sealed at the outer end or necks after being filled with the compressed gas.

Piston 16 is provided with an annular recess 24 as best shown in FIG. 4. This recess carries a sealing O-ring 25, FIGS. 4 and 5. Piston 21 has a similar annular recess 26 carrying a sealing ring 27.

Piston 21 has an additional annular peripheral recess 28 that is much longer axially than either of the annular recesses just described. This recess has the affect of providing the piston 21 with a flange 29 at its right end. The flange 29, as best seen in FIGS. 2 and 7, is provided with a plurality of apertures 30 whereby the annular recess 28 communicates with the chamber 31 between the two pistons, thus making recess 28 in effect a part of the chamber 31, this whole region being sealed off from the two end portions of the cylinder 17 by the O-rings 25 and 27.

Piston 21 is provided with still another annular recess 32, FIGS. 2 and 10. This recess carries a resilient retaining or snap ring 33, FIGS. 2 and 10. In the position in which piston 21 is shown in these two figures, this resilient ring is abutting against the inner wall 34 of the main cylinder 17. The axial position in which piston 21 is shown within the cylinder 17 in FIG. 2 is the position that it occupies at the time of assembly, as well as at all times thereafter until the device is actuated in a manner hereinafter to be described. In order to make certain that the piston 21 does not move from this position during assembly, a keeper pin 35, having a handling loop 36, FIG. 3, at its outer end, passes not only through the walls of the cylinder 17 but also through the axially protruding rounded portion 36 on the left end of the piston 21. As long as the keeper pin 35 is in place, the piston is thus unable to move axially from the position shown in FIGS. 2 and 3.

The piston 16 in the right end of the main cylinder 17 is provided with a piercing pin 37 that extends axially to the left from the center of the left surface of the piston 16. Inasmuch as the cartridge or capsule 23 is so positioned in its nest within the recess 22 of the piston 21 that its longitudinal axis is coincident with the axis of the cylinder, it will be clear that the piercing pin 37, when all of the parts are in the position shown in FIG. 2, is poised for piercing the seal in the neck of the compressed gas cylinder 23.

The piston 16 is retained in its axial position with respect to the cylinder 17 by means of a shear pin 38 that passes all the way through the cylinder 17 and the intervening piston 16. At all times prior to the actuation of the device, the piercing pin 37 and the neck of the cartridge 23 are separated by a short distance as clearly shown in FIG. 2.

From the foregoing description it will doubtless be clear that only a slight movement of the plunger 21 to the right would cause the neck of the compressed gas cartridge 23 to be pierced by the pin 37. Such movement must be brought about by the tightening of the reefing cord 13 in response to a pull thereon.

In order that the pull on the cord 13 may bring the two pistons together, the presently preferred embodiment of this invention makes provision for the cord 13 to encircle the shearing device and extend longitudinally beneath the cylinder 2, as shown in FIG. 2, and then up and around the protruding rear portion 36 of the plunger 21 and thence back to the right along the top of the cylinder. This particular routing for the cord is made possible in the present embodiment by two holes or notches 40 and 41 positioned diametrically opposite from each other in the cylinder 17. The right edges of these holes or notches are rounded or radiused as shown at 42 and 43 in FIGS. 2 and 4. Two similar holes 44 and 45 are positioned diametrically opposite each other at the opposite end of the cylinder 17, as shown in both FIGS. 2 and 4. The inner or left edges of these holes or notches are rounded at 46 and 47.

It will be observed in FIG. 2 that the rounded edges 42 and 43 of holes 40 and 41 respectively are considerably to the right of the extreme left end of the rounded rear portion 36 of the piston 21. If the reefing line 13 is laced through these holes as the cord is looped around the device in the manner shown in FIG. 2, it should be clear that a pull-on cord 13 in the direction of arrow 48 against a counteracting or immobilizing force on the other end of the cord, as indicated by arrow 49, will cause the looped cord to pull to the right on the rounded left end 36 of the piston 21, thus moving this piston to the right toward the piercing pin 37. As this movement takes place, the piercing pin 37 not only pierces the seal in the neck of the cartridge 23, but the retaining ring 33 in the annular recess 32 near the left end of the piston 21 flips into the annular groove 50, as indicated in FIG. 11, thus locking the piston 21 securely in the longitudinal or axial position with respect to the cylinder 17 that is pictured in FIG. 4.

As soon as the pin 37 has pierced the seal 51 in the neck 52 of the cartridge 23, the gas begins to escape through the newly pierced aperture 52 around the pin 37. The effective size of this opening 52, FIGS. 12 and 13, may be predetermined by the depth of a cut 53 in the side of the pin 37, as will be explained hereinafter; and the speed of escape of the compressed gas into the chamber 31 between the two sealing rings 25 and 27 will determine how soon the gas within this chamber will reach the critical pressure against the piston 16 that will cause it to shear the shear pin 38, thus suddenly forcing the circular cutting blade 15 through the reefing cord 13 and releasing the shroud lines 66, and permitting the parachute 11 to open, as indicated in FIG. 2, where the severed dangling end of the reefing cord that is attached to one of the shroud lines is designated by the reference characters 13a.

In order to assure that the reefing cord 13 will be disposed in satisfactory longitudinal alignment with the cylinder 17 as it encircles the device, two apertures 53 and 54 may be provided in the end plates 120 and 114, respectively, as shown in FIG. 2, and the cord may be so laced through these apertures that aperture 54 in plate 114 will align the cord with aperture 41 at the left end of the cylinder, and aperture 53 in the end plate 120 will align the cord with aperture 54 at the right end of the cylinder 17. The apertures 53 and 54 in end plates 120 and 114 may be provided with grommets 55 and 56 shaped as indicated in the figures and formed from a smooth or polished metal or plastic, such as nylon or Teflon, to reduce friction and facilitate the movement of the cord.

The interval of time that should elapse between the piercing of the capsule 23 (which of course coincides with the yank or pull upon the reefing cord 13) and the shearing of the pin 38 that permits the blade 15 to sever the rip cord 13, manifestly depends upon the height from which the parachute 11 and its load 57 are to be released from the craft carrying them aloft, and also upon the weight of the load 57. This load may be only a small package of supplies, or it can be a tank or a crate of ammunition.

The longer the delaying interval is to be, the slower the gas should escape from the aperture 52 which the piercing pin 37 makes in the seal within the neck of the cartridge. The speed with which the gas escapes may be controlled by reducing the cross sectional area of the pin behind its piercing point, as indicated in FIG. 12, so that a gap 53 of proper size is provided between the shank 37 of the pin and the inside wall 52' of the hole (FIG. 13); for example, in one prototype in which the diameter of the piercing pin was .0625 inch, and the depth of the cut A, FIG. 14, was .007 inch, the interval was approximately 10 seconds using a cartridge in which the gas was compressed to a pressure of approximately 1,000 pounds, which is the usual pressure for the small $CO^2$ cartridges now currently available.

The effectiveness of this means for controlling the length of the interval is of course dependent upon the presence of an open space between the right end of the cartridge 23 and the left surface of the piston 16 from which the pin 37 protrudes. If the right end of the cartridge were to engage this surface of the piston 16, the gas could not escape freely. It is to make sure that such engagement does not occur that the expanding ring 33 is provided in the periphery of the piston 21 to slip into a notch 50 in the inner wall 34 of the cylinder 17 to assure a positive stop for the movement to the right of the piston 21, as hereinbefore explained and as illustrated in FIGS. 10 and 11.

FIGS. 15 and 16 illustrate an alternative means by which the timing interval may be preadjusted. In this embodiment, the shearing pin 37a is hollow, and it is formed much like the end of a hypodermic needle with a sharp sloping end. This piercing needle may be provided with threads 58 at the butt end so that it may be screwed into appropriate threads in a bulkhead 60 that partitions the space within the cylinder.

When this particular embodiment of the invention is actuated, the neck 52a of the cartridge of course impales the piercing pin 37a just as the neck 52 of the cartridge 23 in the FIG. 2 embodiment impales the piercing pin 37, the only difference being that the piercing pin 37a is secured to an immovable part of the structure, whereas the piercing pin 37 of the FIG. 2 embodiment is only temporarily immobilized by the shearing pin 38. The recess 61 in the piercing pin 37a communicates with an L-shaped passageway 62 in the bulkhead 60, and this in turn communicates with an internally threaded recess 63 that threadedly receives the male threaded end 64 of the adjusting screw 65. The threaded aperture 63 opens into a larger passage 66 communicating with a duct 67 which opens into a compression chamber 68 whose left wall 69 is the face of the piston 16a. This piston has a shear pin 38a and is equipped with a circular cutting knife 15a in order to shear the rip cord 13a.

The interval of time that elapses between the piercing of the neck 52a of the cartridge in the FIG. 15 embodiment and the building up of sufficient pressure in the chamber 68 to effect the shearing of pin 38a is of course determined by the space that is provided by any given longitudinal position of the adjusting screw 65 between the male threads of the threaded end 64 of the screw and the female threads in the bulkhead 65. These spaces 70 are indicated in FIG. 16. The total length of the helical passageway that the gas must traverse, is of course determined by the number of threads that are engaged at any specific adjusted position.

Various other embodiments and modifications will suggest themselves to those skilled in the art, and the components shown and described may of course be replaced with other components performing the same or similar functions or these functions plus still additional functions, and the parts may be rearranged and transposed—all without departing from the broad spirit of the invention as succinctly set forth in the appended claims.

The inventors claim:

1. In a time-controlled parachute releasing device, a combination including: a cylinder; a first piston axially movable within said cylinder from a rest position to a discharging position and having (a) an axial cavity therein extending inwardly from one end of the piston for nesting the butt end of a gas cartridge having a sealed neck, and (b) an annular peripheral recess for nesting a sealing O-ring; a second piston axially movable within said cylinder and having (a) a pin extending axially therefrom toward said first piston, and (b) an annular peripheral recess around its periphery for nesting a sealing O-ring; O-rings nesting in said peripheral recesses and engaging the inner walls of said cylinder; said cylinder having a pair of substantially diametrically opposed openings therein located on opposite sides of said first piston between the piston's two ends as they are disposed when said first piston is in said rest position, one of said openings permitting a cord to enter the cylinder therethrough and to extend around the closed end of the first piston and thence through the other opening whereby tension on the cord will exert a force on said end of said first piston to move it from said rest position to said discharging position in which the sealed neck of such cartridge as may be nesting in said first piston will be pierced by said pin, thereby releasing the gas from said cartridge into the region between said O-rings, the pressure of the gas in said region acting to move said second piston.

2. The device of claim 1 in which a cutting tool extends outward from the end of the second piston opposite from said pin and in which an abutment is so fixed in position with respect to said second piston that it will receive the impact of said knife in response to the pressure of said gas.

3. The device of claim 1 in which the cylinder has an annular groove in its inner wall and in which the first piston has an annular slot in its periphery and a retaining ring in said slot, said ring engaging the inner wall of the cylinder when said first piston is in said rest position and expanding outward into said groove to immobilize the first piston in said discharging position as it moves from said rest position toward said second piston.

4. The device of claim 1 in which said cylinder has a pair of diametrically opposed apertures and in which the second piston has a passageway therethrough that may be aligned with said apertures for receiving a shearing pin, said pin serving to retain said second piston in a fixed position against the pressure of gas in the region between said O-rings until the pin shears.

5. The device of claim 1 in which said pin is so peripherally recessed between its ends that the gas within such gas-containing cartridge as may be nesting in said first piston will escape from the cylinder between the pin and the surrounding inner walls of the neck of the cartridge in a predetermined interval of time.

6. In a time-controlled parachute releasing device, a combination including: a cylinder; a first piston axially movable within said cylinder from a rest position to a discharging position and having (a) an axial cavity therein extending inwardly from one end of the piston for nesting the butt end of a gas cartridge having a sealed neck, and (b) an annular peripheral recess for nesting a sealing O-ring; a second piston axially movable within said cylinder and having (a) a pin extending axially therefrom toward said first piston, (b) an annular peripheral recess around its periphery for nesting a sealing O-ring, and (c) a cutting tool extending outward from the end of said second piston opposite from said pin; O-rings nesting in said peripheral recesses and engaging the inner walls of said cylinder; an abutment immobilized with respect to said cylinder in the path of said cutting tool; and means associated with said cylinder whereby a cord longitudinally encircling the cylinder may be so positioned with respect to the closed end of said first piston that tension on the cord will move said first piston and such gas-filled cartridge as may be nesting therein from a rest position to a second position in which said pin will be disposed within said neck, permitting the gas in said cartridge to escape therearound into the region between said O-rings and against the second piston and thereby drive said cutting tool against said abutment to sever such cord as may be interposed therebetween.

References Cited by the Examiner
UNITED STATES PATENTS

| | | | |
|---|---|---|---|
| 2,581,645 | 1/1952 | Frieder et al. | 244—149 |
| 2,606,729 | 8/1952 | Frieder et al. | 30—180 |
| 2,942,818 | 6/1960 | Stott | 244—150 |

WILLIAM FELDMAN, *Primary Examiner.*

J. C. PETERS, *Assistant Examiner.*